United States Patent
Lee et al.

(10) Patent No.: US 12,014,883 B2
(45) Date of Patent: Jun. 18, 2024

(54) TANTALUM CAPACITOR INCLUDING CONDUCTIVE POLYMER LAYER HAVING A FILLER

(71) Applicant: SAMSUNG ELECTRO-MECHANICS CO., LTD., Suwon-si (KR)

(72) Inventors: Yong Hyun Lee, Suwon-si (KR); Jin Ho Hong, Suwon-si (KR); Hyun Sub Oh, Suwon-si (KR); Youn Soo Kim, Suwon-si (KR); Jae Bum Cho, Suwon-si (KR); Hee Sung Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 184 days.

(21) Appl. No.: 17/834,277

(22) Filed: Jun. 7, 2022

(65) Prior Publication Data
US 2023/0140133 A1 May 4, 2023

(30) Foreign Application Priority Data
Oct. 28, 2021 (KR) .................. 10-2021-0145574

(51) Int. Cl.
*H01G 9/028* (2006.01)
*H01G 9/025* (2006.01)
*H01G 9/042* (2006.01)
*H01G 9/15* (2006.01)

(52) U.S. Cl.
CPC ............ *H01G 9/025* (2013.01); *H01G 9/028* (2013.01); *H01G 9/042* (2013.01); *H01G 9/15* (2013.01)

(58) Field of Classification Search
CPC ........... H01G 9/15; H01G 9/042; H01G 9/028
See application file for complete search history.

(56) References Cited

U.S. PATENT DOCUMENTS

| | | | | |
|---|---|---|---|---|
| 2009/0231782 A1* | 9/2009 | Fujita | .................. | H01G 9/028 361/525 |
| 2010/0254072 A1* | 10/2010 | Nobuta | .............. | H01G 9/0036 427/80 |

FOREIGN PATENT DOCUMENTS

| | | | | |
|---|---|---|---|---|
| JP | 09320901 A | * | 12/1997 | |
| JP | 2014027040 A | * | 2/2014 | |
| JP | 2014112653 A | * | 6/2014 | .......... H01G 9/0036 |
| JP | 2020-509599 A2 | | 3/2020 | |
| KR | 20030043654 A | * | 6/2003 | |
| KR | 10-2005-0057918 A | | 6/2005 | |
| KR | 10-2020-0127049 A | | 11/2020 | |
| WO | WO-0116972 A1 | * | 3/2001 | ............. H01G 11/56 |

(Continued)

*Primary Examiner* — David M Sinclair
(74) *Attorney, Agent, or Firm* — Morgan, Lewis & Bockius LLP (57) ABSTRACT

A tantalum capacitor includes a sintered tantalum body including tantalum powder, a conductive polymer layer disposed on the sintered tantalum body and including a first filler, a carbon layer disposed on the conductive polymer layer; and a tantalum body including a tantalum wire penetrating through at least a portion of each of the sintered tantalum body and the conductive polymer layer in a first direction. A ratio of an area of the first filler to an area of the conductive polymer layer is greater than 0.38 in a first cross-section partially overlapping the sintered tantalum body, among cross-sections perpendicular to the first direction.

23 Claims, 6 Drawing Sheets

(56) References Cited

FOREIGN PATENT DOCUMENTS

| WO | 2018/165065 A1 | 9/2018 |
| WO | 2019/246400 A1 | 12/2019 |

\* cited by examiner

TANTALUM CAPACITOR INCLUDING CONDUCTIVE POLYMER LAYER HAVING A FILLER

CROSS-REFERENCE TO RELATED APPLICATION(S)

The present application claims the benefit of priority to Korean Patent Application No. 10-2021-0145574, filed on Oct. 28, 2021 in the Korean Intellectual Property Office, the entire disclosure of which is incorporated herein by reference.

TECHNICAL FIELD

The present disclosure relates to a tantalum capacitor, and more particularly, to a tantalum capacitor having improved reliability by reducing a moisture absorption amount without increasing equivalent series resistance.

BACKGROUND

Tantalum (Ta) is a metal that is widely used throughout various industries such as the electrical, electronic, mechanical, chemical, aerospace, and military industries, due to having mechanical and physical characteristics such as a high melting point, excellent ductility and excellent corrosion-resistance, or the like.

In particular, since the tantalum material may form the most stable anodic oxide film, tantalum has been widely used as a material in forming anodes for small capacitors.

Moreover, due to the rapid development of the IT industry, such as electronics and information and communication, the use of tantalum is increasing rapidly every year.

A tantalum capacitor has a structure that uses a gap that appears when the tantalum powder is sintered and hardened, and forms tantalum oxide ($Ta_2O_5$) on a surface of the tantalum as an electrode metal by an anodic oxidation method, and uses the oxide as a dielectric to form a manganese dioxide ($MnO_2$) layer or a conductive polymer layer thereon as a solid electrolyte.

In addition, due to the derivation of a cathode electrode, a silver (Ag) layer is formed as a carbon layer and a metal layer on the manganese dioxide ($MnO_2$) layer or the conductive polymer layer.

A tantalum capacitor has characteristics such as low equivalent series resistance (ESR) and high ripple current rating.

For this reason, the tantalum capacitor may have significantly improved temperature dependence and a longer service life than an aluminum electrolyte capacitor.

However, high moisture absorption properties of a conductive polymer layer may affect reliability evaluation and may cause a need for an additional solution improve performance of the polymer itself. In particular, a non-conductive material may be contained in the conductive polymer layer to effectively block a current path through which leakage current (LC) is generated.

SUMMARY

An aspect of the present disclosure is to provide a tantalum capacitor having improved reliability by reducing a moisture absorption rate without increasing equivalent series resistance.

Another aspect of the present disclosure is to provide a tantalum capacitor having reliability improved in a high-temperature or high-humidity environment.

According to an aspect of the present disclosure, a tantalum capacitor includes: a tantalum body including a sintered tantalum body including tantalum particle, a conductive polymer layer disposed on the sintered tantalum body and including a first filler, and a tantalum wire penetrating through at least a portion of each of the sintered tantalum body and the conductive polymer layer in a first direction. A ratio of an area of the first filler to an area of the conductive polymer layer is greater than 0.38 in a first cross-section partially overlapping the sintered tantalum body, among cross-sections perpendicular to the first direction.

According to an aspect of the present disclosure, a tantalum capacitor includes: a sintered tantalum body including tantalum particle; a conductive polymer layer disposed on the sintered tantalum body and comprising a first filler; a carbon layer disposed on the conductive polymer layer; and a tantalum body comprising a tantalum wire penetrating through at least a portion of each of the sintered tantalum body and the conductive polymer layer in a first direction. When a cross-section partially overlapping the sintered tantalum body, among cross-sections perpendicular to the first direction, is a first cross-section including a plurality of first regions spaced apart from each other and each of the first region having a square shape of which a center of gravity is disposed on an extension line connecting a ⅓ point of a thickness of the conductive polymer layer, an average of ratios of an area of the first filler to an area of the conductive polymer layer in the plurality of first regions is greater than 0.38.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

Hereinafter, exemplary embodiments of the present disclosure will be described with reference to accompanying drawings.

In the drawings, an X-direction may be defined as a first direction, an L direction, or a length direction, a Y-direction may be defined as a second direction, a W direction, or a width direction, and a Z-direction defined as a third direction, a T direction, or a thickness direction.

Figure 1:
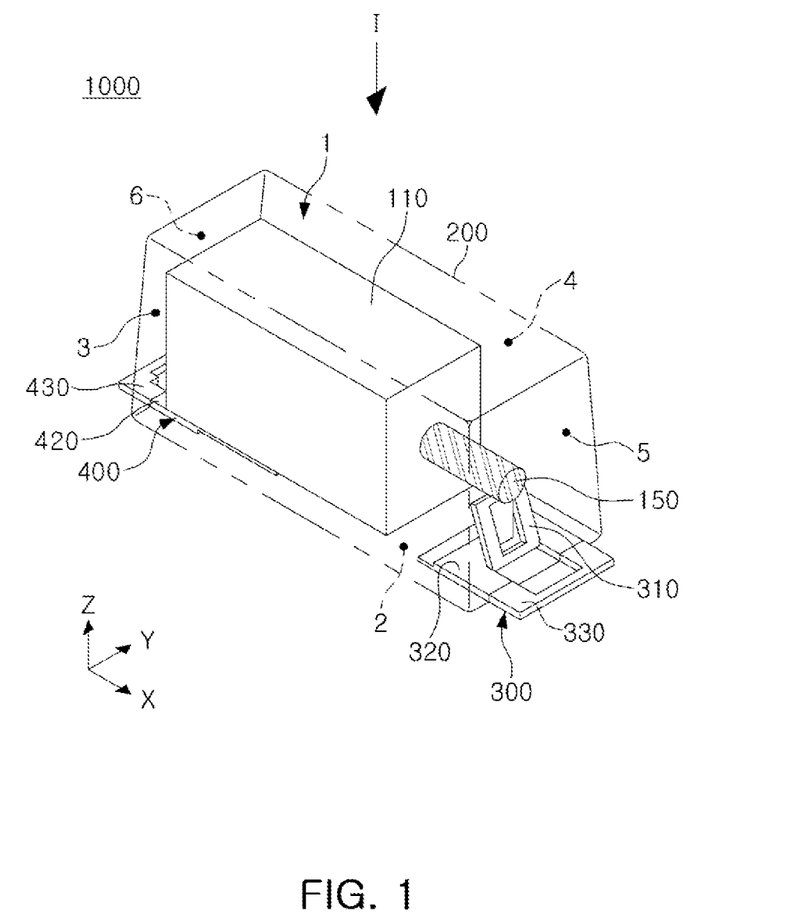
FIG. 1 is a perspective view of a tantalum capacitor according to the present disclosure.

FIG. 1 is a perspective view of a tantalum capacitor according to the present disclosure.

Referring to FIG. 1, the tantalum capacitor 1000 according to an exemplary embodiment may include a tantalum body 100 including tantalum powder (or particle), and having a tantalum wire 150 exposed to one end surface, a molding portion 200 having fifth and sixth surfaces 5 and 6 opposing each other in a first direction, third and fourth surfaces 3 and 4 opposing each other in a second direction, and first and second surfaces 1 and 2 opposing each other in a third direction, and formed to surround the tantalum body 100, an anode lead frame 300 exposed to (or extend from) the second surface 2 of the molding portion 200 and electrically connected to the tantalum wire 150, and a cathode lead frame 400 spaced apart from the anode lead frame 300 and exposed to (or extend from) the second surface 2 of the molding portion 200.

The tantalum body 100 may have a tantalum wire 150 exposed in an X-direction of the body. In this case, the tantalum wire 150 may penetrate through at least a portion of the sintered tantalum body 110 in the first direction X. The tantalum wire 150 may be inserted into a mixture of the tantalum powder and a binder to be off-centered within the body, before mixed powder of the tantalum powder and the binder is compressed. For example, the tantalum body 100 may be manufactured by molding a tantalum element in a desired size by inserting the tantalum wire 150 into the tantalum powder mixed with the binder and sintering the tantalum element at a high temperature under high vacuum ($10^{-5}$ torr or less) for about 30 minutes.

The molding portion 200 may be formed to cover the tantalum body 100 and to expose one surface of a first connection portion 320 of the anode lead frame 300 and one surface of a second connection portion 420 of the cathode lead frame 400.

The molding portion 200 of the tantalum capacitor according to the present disclosure may be formed by transfer-molding a resin such as an epoxy molding compound (EMC) to surround the tantalum body 100. The molding portion 200 may serve to protect the tantalum wire 150 and the tantalum body 100 from the outside.

The anode lead frame 300 may be formed of a conductive metal such as a nickel/iron alloy, and may include a first connection portion 320, a first lead portion 330, and a first bent portion 310. The first bent portion 310 may be inclined toward the tantalum body 100 with respect to the first connection portion 320. The first connection portion 320 of the anode lead frame 300 may be exposed to the second surface 2 of the molding portion 200. The first connection portion 320 may be exposed to a lower surface of the molding portion 200 to serve as a terminal when a board is mounted. In this case, the third connection portion 320 may be spaced apart from the tantalum body 100 and may function as an anode of the tantalum capacitor 1000 according to the present disclosure.

The cathode lead frame 400 may be formed of a conductive metal such as a nickel/iron alloy, and may include a second bent portion, a second connection portion 420, and a second lead portion 430 formed to be integrated with each other.

The second connection portion 420 may be disposed to be parallel to and spaced apart from the first connection portion 320 of the anode lead frame 300 in the first direction X. The second connection portion 420 of the cathode lead frame 400 may be exposed to the second surface 2 of the molding portion 200. The second connection portion 420 may be exposed to a lower surface of the molding portion 200 to serve as a terminal when the board is mounted. In this case, the second connection portion 420 may be in contact with the tantalum body 100 and may function as a cathode of the tantalum capacitor 1000 according to the present disclosure.

Figure 2:
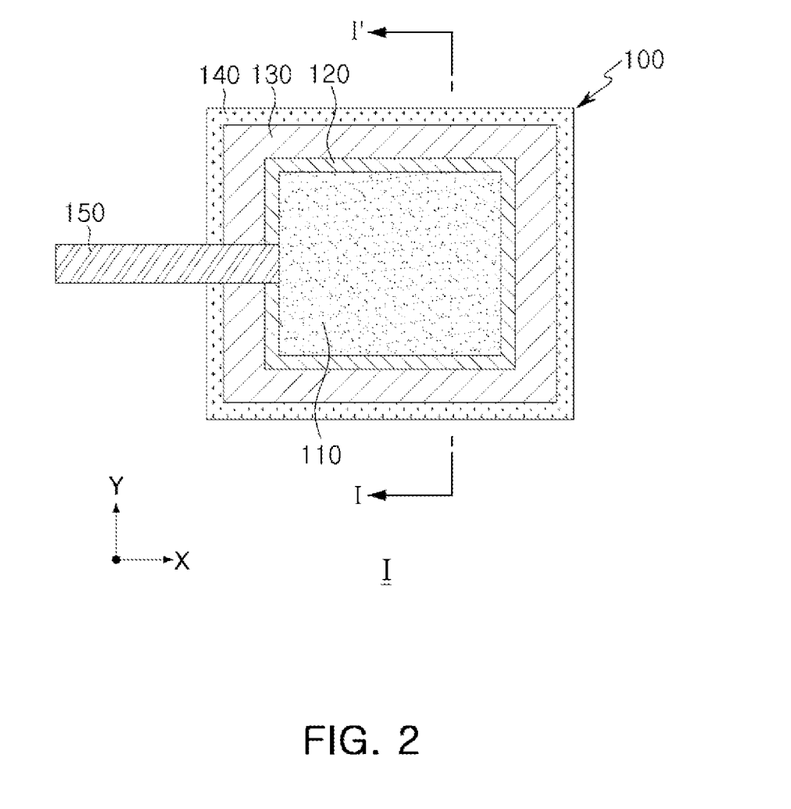
FIG. 2 is a cross-sectional view of a tantalum body in a tantalum capacitor according to the present disclosure, taken in an I-direction.

FIG. 2 is a cross-sectional view of a tantalum body in a tantalum capacitor according to the present disclosure, taken in an I-direction.

Referring to FIG. 2, a tantalum body 100 of a tantalum capacitor 1000 according to an exemplary embodiment may include a sintered tantalum body 110 formed by sintering a molded body including a metal powder, a conductive polymer layer 120 disposed on the sintered tantalum body 110, a carbon layer 130 disposed on the conductive polymer layer 120, and a silver (Ag) layer 140 disposed on the carbon layer 130.

The tantalum capacitor may further include a tantalum wire 150 having an insertion region, disposed inside the sintered tantalum body 110, and a non-insertion region disposed outside the sintered tantalum body 110.

The sintered tantalum body 110 may be formed by sintering a formed body including a metal powder and a binder.

For example, the sintered tantalum body 110 may be manufactured by mixing and stirring a metal powder, a binder, and a solvent at a predetermined ratio, compressing the mixed powder into a rectangular parallelepiped form, and sintering the compressed powder under high temperature and high vibration.

The metal powder is not limited as long as it may be used in the sintered tantalum body 110 of the tantalum capacitor 1000 according to an exemplary embodiment, and may be tantalum (Ta) powder. However, the metal powder may include at least one selected from the group consisting of aluminum (Al), niobium (Nb), vanadium (V), titanium (Ti) and zirconium (Zr), but is not limited thereto. Accordingly, rather than a sintered tantalum body, an aluminum sintered body, a niobium sintered body, or the like, may be used.

The binder is not limited and may include, for example, a cellulose-based binder.

The cellulose-based binder may include at least one selected from the group consisting of nitrocellulose, methyl cellulose, ethyl cellulose, and hydroxy propyl cellulose.

In addition, the tantalum wire 150 may be inserted into and mounted thereon to be eccentric from the center before compressing the mixed powder.

According to an exemplary embodiment, a dielectric oxide layer may be formed on the sintered tantalum body 110 as an insulating layer. For example, the dielectric oxide layer may be formed by growing an oxide layer ($Ta_2O_5$) on a surface of the sintered tantalum body 110 by a chemical formation process using an electrochemical reaction. In this case, the dielectric oxide layer may change the sintered tantalum body 110 into a dielectric material. In addition, a conductive polymer layer 120 having a polarity of a cathode may be applied to the dielectric oxide layer. In some embodiments, the conductive polymer layer 120 is disposed directly on the dielectric oxide layer.

The conductive polymer layer 120 is not limited and may include, for example, a conductive polymer.

For example, a conductive polymer may be formed by polymerization or electrolytic polymerization of 3,4-ethylenedioxythiophene (EDOT) or pyrrole monomer, and may then be formed as a cathode layer having a conductive polymer cathode formed on an external surface of the sintered tantalum body 110 formed as an insulating layer.

For example, the conductive polymer layer 120 may be formed using polymer slurry, and the polymer slurry may include at least one of polypyrrole, polyaniline, or 3,4-ethylenedioxythiophene (EDOT). In addition, the conductive polymer layer 120 may include poly(3,4-ethylenedioxythiophene):poly(styrenesulfonate) (PEDOT:PSS). PEDOT:PSS may be prepared by oxidative polymerization of EDOT using polystyrene sulfonate (PSS) as a template for balancing charges.

The carbon layer 130 may be laminated on the conductive polymer layer 120, and may laminated by dissolving carbon powder in an organic solvent, containing an epoxy-based resin, to impregnate the sintered tantalum body 110 in a solution, in which the carbon powder is dissolved, and drying the organic solvent at a predetermined temperature to be volatilized.

In addition, the carbon layer 130 may serve to prevent silver (Ag) ions to passing therethrough.

A silver (Ag) layer 140, formed of a silver (Ag) paste, may be included on an upper surface of the carbon layer 130.

The silver (Ag) layer 140 may be laminated on the outside of the carbon layer 130 to improve conductivity.

In addition, the silver (Ag) layer 140 may improve the conductivity for polarity of the cathode layer to facilitate an electrical connection for polarity transfer.

Figure 3:
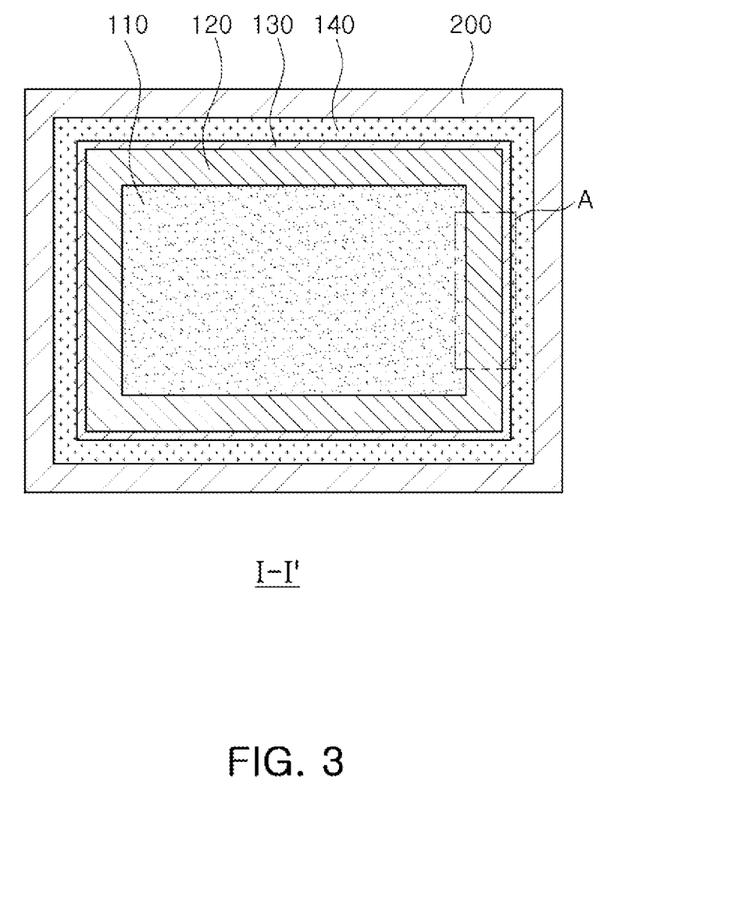
FIG. 3 is a cross-sectional view taken along line I-I' of FIG. 2.

FIG. 3 is a cross-sectional view taken along line I-I' of FIG. 2.

Figure 4:
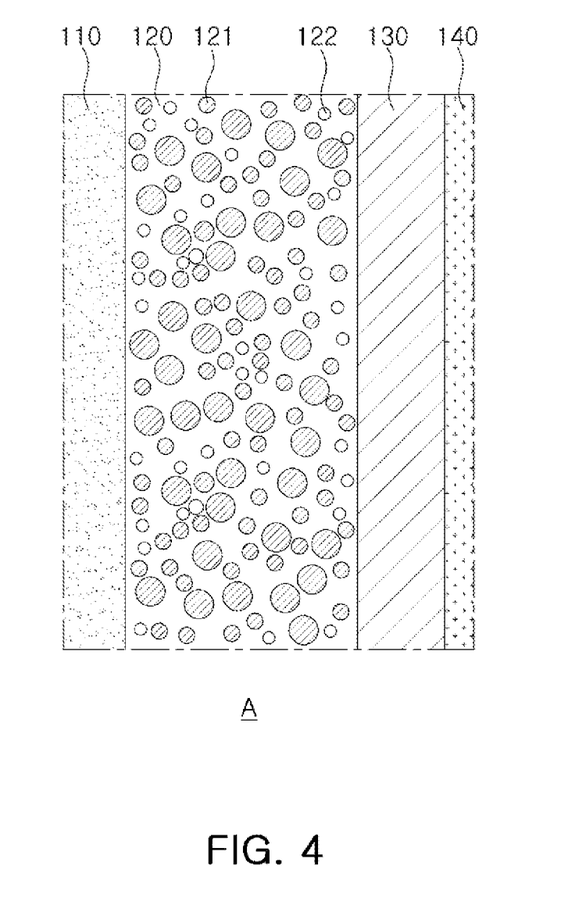
FIG. 4 is an enlarged view of region "A" of FIG. 3.

FIG. 4 is an enlarged view of region "A" of FIG. 3.

In the case of the tantalum capacitor 1000 according to an exemplary embodiment, in the above-described conductive polymer layer 120, a polymer slurry for forming the conductive polymer layer 120 may further include first and second fillers 121 and 122.

In the present disclosure, the first filler 121 may be a non-conductive particle. As an example, the first filler 121 may be silica ($SiO_2$). However, exemplary embodiments are not limited thereto, and the first filler 121 may include one or more metal oxides, among $BaTiO_3$, $Al_2O_3$, and $ZrO_2$. In a tantalum capacitor according to the related art, a conductive polymer layer has high-moisture absorption properties, resulting in low reliability of a capacitor. In the present disclosure, the first filler 121 including non-conductive particles such as silica may be disposed in the conductive polymer layer 120, so that a moisture absorption rate of the conductive polymer layer 120 may be effectively reduced.

In addition, the conductive polymer layer 120 in the present disclosure may include the first filler 121, a non-conductive filler, so that a flow of current causing leakage current (LC) may be prevented and strength of the conductive polymer layer 120 may be increased to improve overall characteristics of the capacitor 1000.

A cross-section of the tantalum body 100, perpendicular to the first direction X includes a cross-section partially overlapping the sintered tantalum body 110. In the partially overlapping cross-section, a ratio of an area of the first filler 121 to an area of the conductive polymer layer 120 may be greater than 0.38 to less than 0.83, in detail, 0.55 or more to 0.81 or less. In some embodiments, the ratio may be 0.55 or more and less than 0.83.

As an example of the above ratio, cross-sections of FIG. 3 and FIG. 4 are illustrated. Referring to FIG. 3 which is a cross-sectional view taken along line I-I' of FIG. 2, a first cross-section 1000A of the tantalum body 100 is illustrated. The first cross-section 1000A is a cross-section of the tantalum body 100, taken using a cross-section in which a length of the sintered tantalum body 110 in the first direction X is cut by 2:1.

However, the first cross-section 1000A is an example of the cross-section partially overlapping the sintered tantalum body 110, among the cross-sections of the tantalum body 100, perpendicular to the first direction X. The characteristics regarding the numerical range are not limited to the first cross-section 1000A, and may be applied to other cross-sections perpendicular to the first direction X and overlapping the sintered tantalum body 110.

In the tantalum capacitor 1000 according to the present disclosure, the tantalum wire 150 may penetrate through at least a portion of the tantalum body 100 in the first direction X. In the first cross-section 1000A partially overlapping the sintered tantalum body 110, among cross-sections perpendicular to the first direction X, a ratio of an area of the first filler 121 to an area of the conductive polymer layer 120 may be greater than 0.38 or may be 0.55 or more.

In addition, in the first cross-section 1000A, the ratio of the area of the first filler 121 to the area of the conductive polymer layer 120 may be less than 0.83.

The term "area" of the conductive polymer layer 120 or the first filler 121 may refer to an area occupied by each element on the first cross-section 1000A. In the present disclosure, the first filler 121 is an element included in the conductive polymer layer 120, so that the area of the conductive polymer layer 120 may be interpreted as including the area of the first filler 121. For example, the area of the first filler 121 cannot be larger than the area of the conductive polymer layer 120.

In the present disclosure, the second filler 122 to be described later is also an element included in the conductive polymer layer 120, so that the area of the conductive polymer layer 120 may be interpreted as including both the area of the first filler 121 and the area of the second fillers 122. For example, in the description of the "area" of the present disclosure, the area of each of the first and second fillers 121 and 122 or the sum of the areas of the first and second fillers 121 and 122 cannot be larger than the area of the conductive polymer layer 120.

The Table 1 illustrates characteristics of the tantalum capacitor 1000 depending on the ratio of the area of the first filler 121 to the area of the conductive polymer layer 120 in the first cross-section 1000A partially overlapping the sintered tantalum body 110, among cross-sections perpendicular to the first direction X. The moisture absorption rate was evaluated by a rate of change in weight measured after 90 minutes or more elapsed in an environment at a temperature of 85° C. and relative humidity of 85% as a moisture absorption rate.

TABLE 1

|  | Ratio of Area of First Filler to Area of Conductive Polymer Layer | Equivalent Series Resistance (ESR, mΩ) | Moisture Absorption Rate of Conductive Polymer Layer (%) | Leakage Current (LC, μA) |
|---|---|---|---|---|
| Comparative Example 1 | 0 | 105 | 16.5 (10 or more NG) | 2.04 |
| Comparative Example 2 | 0.23 | 104 | 14 (10 or more NG) | 1.95 |
| Comparative Example 3 | 0.38 | 104 | 11.5 (10 or more NG) | 1.82 |
| Embodiment 1 | 0.55 | 103 | 8.9 | 1.71 |
| Embodiment 2 | 0.64 | 103 | 7.4 | 1.63 |
| Embodiment 3 | 0.71 | 103 | 6.1 | 1.62 |
| Embodiment 4 | 0.75 | 103 | 5.1 | 1.60 |
| Embodiment 5 | 0.78 | 109 | 4.6 | 1.54 |
| Embodiment 6 | 0.81 | 118 | 4.0 | 1.53 |
| Comparative Example 4 | 0.83 | 135 (NG) | 3.7 | 1.41 |

As illustrated in Table 1, when the ratio of the area of the first filler 121 to the area of the conductive polymer layer 120 in a cross-section partially overlapping the sintered tantalum body 110, among cross-sections perpendicular to the first direction X, for example, the first cross-section 1000A, is 0.38 or less, an moisture absorption rate of the conductive polymer layer 120 may be increased to 10% or more to deteriorate reliability of the tantalum capacitor 1000.

In terms of equivalent series resistance (ESR), when the ratio of the area of the first filler 121 to the area of the conductive polymer layer 120 in the first cross-section 1000A is 0.83 or more, ESR may be increased by 30% or more, as compared with Comparative Example 1 in which a filler is not contained, to deteriorate the reliability of the tantalum capacitor 1000.

As described above, in the tantalum capacitor 1000 according to the present disclosure, the ratio of the area of the first filler 121 to the area of the conductive polymer layer 120 in a cross-section partially overlapping the sintered tantalum body 110, among cross-sections perpendicular to the first direction X, for example, the first cross-section 1000A may be maintained to be more than 0.38 to less than 0.83, in detail, 0.55 or more to 0.81 or less. Thus, the moisture absorption rate of the conductive polymer layer 120 may be reduced within a range, in which the ESR is not increased by 30% or more, to improve characteristics of the tantalum capacitor 1000.

Referring to the cross-sectional view of the region "A" of FIG. 4, the first filler 121 may be dispersed in the conductive polymer layer 120. In addition, as described later, the second filler 122 may also be dispersed in the conductive polymer layer 120.

The conductive polymer layer 120 in the present disclosure may further include a second filler 122 including one or more conductive particles, among graphene, carbon nanotubes, and black carbon. Since the conductive polymer layer 120 includes the second filler 122 formed of conductive particles, a thickness of the conductive polymer layer 120 in a central portion of the sintered tantalum body 110 may be easily adjusted.

For example, one or more conductive particles, among graphene, carbon nanotubes, and black carbon, may cause a coffee ring effect in a process of forming the conductive polymer layer 120 on the sintered tantalum body 110.

For example, polymer slurry containing one or more conductive particles, among graphene, carbon nanotubes, and black carbon, starts to be evaporated from an edge surface of the sintered tantalum body 110. Particle density may be increased in a portion in which evaporation occurs first. Surrounding slurries and particles may be further pulled due to the increased particle density and high solid content, so that a thickness of the conductive polymer layer 120, disposed in a corner portion of the sintered tantalum body 110, may be increased to facilitate control of the thickness.

According to an exemplary embodiment, the conductive polymer layer 120 may selectively select particles having different conductivities, among graphene, carbon nanotubes, and black carbon, so that equivalent series resistance (ESR) of the tantalum capacitor may be adjusted to a desired level.

An average particle size of the first and second fillers 121 and 122 may be 100 nm or more to 1 μm or less, in detail, 40 nm or more to 5 μm or less, but exemplary embodiments are not limited thereto.

Figure 5:
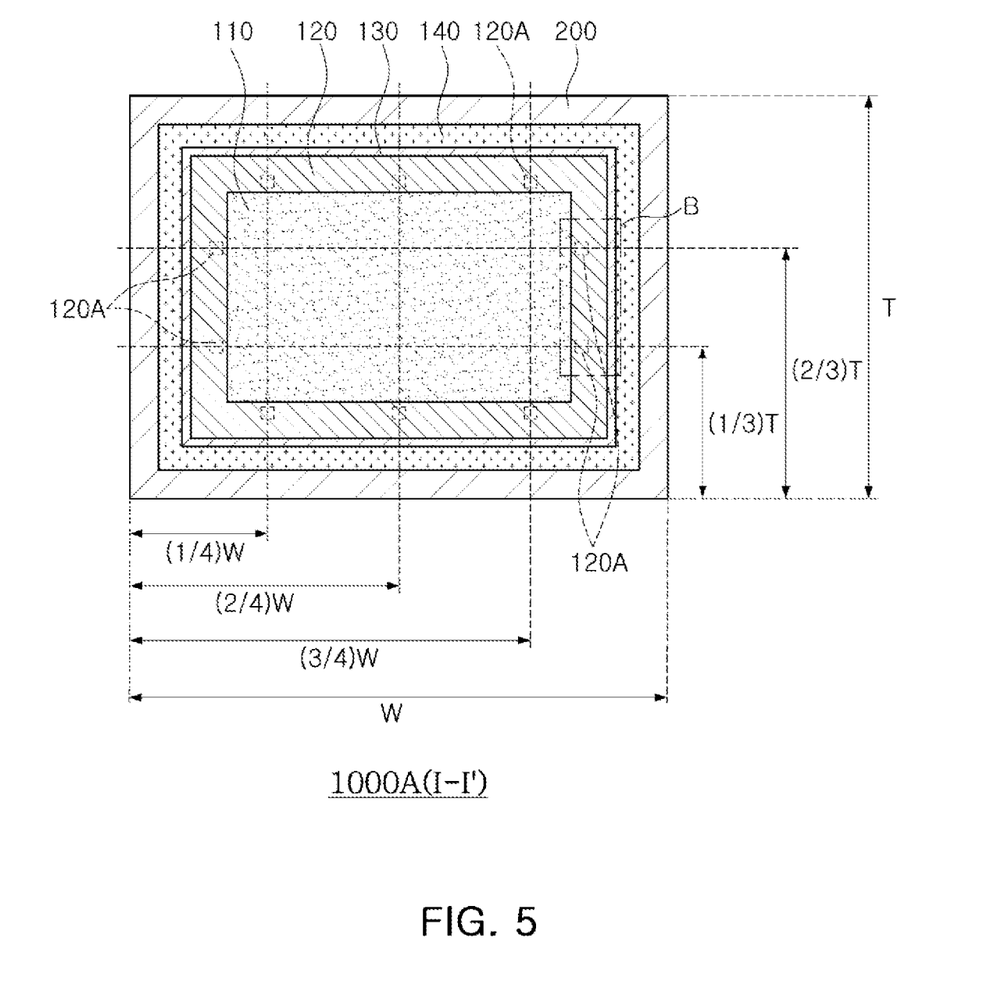
FIG. 5 is a cross-sectional view taken along line I-I' of FIG. 2 and illustrating a method of measuring a content of a filler in a conductive polymer layer according to the present disclosure.

FIG. 5 is a cross-sectional view taken along line I-I' of FIG. 2 and illustrating a method of measuring a content of a filler in a conductive polymer layer according to the present disclosure.

FIG. 5 is an enlarged view of region "B" of FIG. 4.

FIG. 5 illustrates a method of measuring a ratio of an area of the first filler 121 to an area of the conductive polymer layer 120 in a cross-section partially overlapping the sintered tantalum body 110, among cross-sections perpendicular to the first direction X, for example, the first cross-section 1000A, as described above.

In the tantalum capacitor 1000 according to the present disclosure, the phrase "ratio of the area of the first filler 121 to the area of the conductive polymer layer 120 in the first cross-section 1000A" may refer to an average value of ratios of the area of the first filler 121 to the area of the conductive polymer layer 120 measured in a plurality of regions according to a measurement method to be described later.

As described above, the first cross-section 1000A may cut a length of the sintered tantalum body 110 in the first direction X by 2:1. In the conductive polymer layer 120 exposed to the first cross-section 1000A, ten points spaced apart from each other may be selected to measure the ratio of the area of the first filler 121 to the area of the conductive polymer layer 120.

According to an example of the measurement method of FIG. 5, a square-shaped region having ten points, spaced apart from each other, as centers of gravity in an extension line, connecting a ⅓ point of the thickness of the conductive polymer layer, in the first cross-section 1000A may be selected and designated as a plurality of first regions 120A. In the example of FIG. 5, six first regions 120A are selected at a boundary dividing a width W of the tantalum body 100 into four equal lengths, and four first regions 120A are selected at a boundary dividing a thickness T of the tantalum body 100 into three equal thicknesses. That is, ten points spaced apart from each in a conductive polymer layer 120 may be selected. In addition, although the number of the first regions 120A has been described as being ten, it may be less or more than ten.

In this case, the first region 120A may be in the form of a square having a corner length (or edge length) of 5 μm. Then, the ratio of the area of the first filler 121 to the area of the conductive polymer layer 120 in each of the plurality of first regions 120A may be measured using an measurement apparatus such as a scanning electron microscope (SEM). When the ratio is measured, the magnification of the SEM may be *15,000 or more and an acceleration voltage may be 10 kV or more. However, the magnification and the acceleration voltage may vary as necessary.

Figure 6:
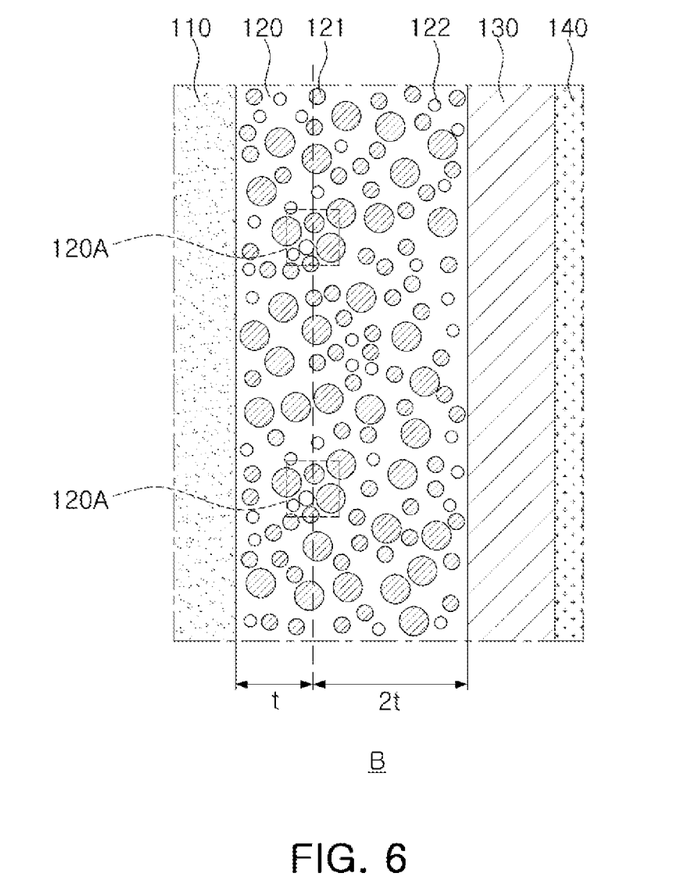
FIG. 6 is an enlarged view of region "B" of FIG. 5.

FIG. 6 is an enlarged view of region "B" of FIG. 5. As illustrated in FIG. 6, the plurality of first regions 120A may be in the form of squares spaced apart from each other. In this case, each of the first regions 120A may be in the form of a square of which a center of gravity is disposed on an extension line connecting a ⅓ point of a thickness of a conductive polymer layer.

For example, when the thickness of the conductive polymer layer 120 is 3 t, as shown in FIG. 6, the center of gravity of a square representing each of the first regions 120A may be disposed a virtual extension line the thickness 3 t of the conductive polymer layer 120 by t:2 t, as illustrated in FIG. 6.

The average value of the ratios of the area of the first filler 121 to the area of the conductive polymer layer 120, measured in the plurality of first regions 120A by the above-described method, may refer to a ratio of an area of the first filler 121 to an area of the conductive polymer layer 120 in the tantalum capacitor 1000 according to the present disclosure.

As described above, a tantalum capacitor having reliability improved by reducing a moisture absorption rate without increasing equivalent series resistance may be provided.

In addition, a tantalum capacitor having reliability improved in a high-temperature or high-humidity environment may be provided.

While exemplary embodiments have been shown and described above, it will be apparent to those skilled in the art that modifications and variations could be made without departing from the scope of the present disclosure as defined by the appended claims.

What is claimed is:

1. A tantalum capacitor comprising:
a tantalum body comprising
a sintered tantalum body including tantalum particle,
a conductive polymer layer disposed on the sintered tantalum body and including a first filler, and
a tantalum wire penetrating through at least a portion of each of the sintered tantalum body and the conductive polymer layer in a first direction,
wherein a ratio of an area of the first filler to an area of the conductive polymer layer is greater than 0.38 in a first cross-section partially overlapping the sintered tantalum body, among cross-sections perpendicular to the first direction.

2. The tantalum capacitor of claim 1, wherein the ratio of the area of the first filler to the area of the conductive polymer layer is less than 0.83 in the first cross-section.

3. The tantalum capacitor of claim 2, wherein the ratio of the area of the first filler to the area of the conductive polymer layer is 0.55 or more and 0.81 or less in the first cross-section.

4. The tantalum capacitor of claim 3, wherein the first cross-section cuts a length of the sintered tantalum body in the first direction by 2:1.

5. The tantalum capacitor of claim 4, wherein the conductive polymer layer includes poly(3,4-ethylenedioxythiophene):poly(styrenesulfonate) (PEDOT:PSS).

6. The tantalum capacitor of claim 5, wherein the first filler includes one or more metal oxides, among $BaTiO_3$, $Al_2O_3$, $SiO_2$, and $ZrO_2$.

7. The tantalum capacitor of claim 6, wherein the first filler includes $SiO_2$.

8. The tantalum capacitor of claim 7, wherein the conductive polymer layer further comprises a second filler, and the second filler includes at least one of graphene, carbon nanotubes, and carbon black.

9. The tantalum capacitor of claim 7, wherein the tantalum body further comprises:
a carbon layer disposed on the conductive polymer layer; and
a silver (Ag) layer disposed on the carbon layer.

10. The tantalum capacitor of claim 9, wherein the tantalum wire further penetrates through the carbon layer and the silver (Ag) layer.

11. The tantalum capacitor of claim 10, comprising:
a molding portion having fifth and sixth surfaces opposing each other in the first direction, third and fourth surfaces opposing each other in a second direction, and first and second surfaces opposing each other in a third direction, and disposed to surround the tantalum body;
an anode lead frame extending from the second surface of the molding portion and electrically connected to the tantalum wire; and
a cathode lead frame spaced apart from the anode lead frame and extending from the second surface of the molding portion.

12. The tantalum capacitor of claim 1, further comprising a dielectric oxide layer disposed between the sintered tantalum body and the conductive polymer layer, and the conductive polymer layer is disposed directly on the dielectric oxide layer.

13. The tantalum capacitor of claim 1, wherein the first filler is a non-conductive particle and a ratio of the area of the first filler to the area of the conductive polymer layer is 0.55 or more.

14. The tantalum capacitor of claim 1, wherein the conductive polymer layer further comprises a second filler including one or more conductive particles.

15. A tantalum capacitor comprising:
a sintered tantalum body including tantalum particle;
a conductive polymer layer disposed on the sintered tantalum body and comprising a first filler;
a carbon layer disposed on the conductive polymer layer; and
a tantalum body comprising a tantalum wire penetrating through at least a portion of each of the sintered tantalum body and the conductive polymer layer in a first direction,
wherein when a cross-section partially overlapping the sintered tantalum body, among cross-sections perpendicular to the first direction, is a first cross-section including a plurality of first regions spaced apart from each other and each of the first region having a square shape of which a center of gravity is disposed on an extension line connecting a ⅓ point of a thickness of the conductive polymer layer, an average of ratios of an area of the first filler to an area of the conductive polymer layer in the plurality of first regions is greater than 0.38.

16. The tantalum capacitor of claim 15, wherein the average of the ratios of the area of the first filler to the area of the conductive polymer layer in the plurality of first regions is less than 0.83.

17. The tantalum capacitor of claim 16, wherein the average of the ratios of the area of the first filler to the area of the conductive polymer layer in the plurality of first regions is 0.55 or more and 0.81 or less.

18. The tantalum capacitor of claim 17, wherein an edge of each of the plurality of first regions has a length of 5 μm.

19. The tantalum capacitor of claim 18, further comprising:
a silver (Ag) layer disposed on the carbon layer.

20. A tantalum capacitor comprising:
a tantalum body comprising a sintered tantalum body including tantalum particle, a conductive polymer layer disposed on the sintered tantalum body and including a first filler, and a tantalum wire penetrating through at least a portion of each of the sintered tantalum body and the conductive polymer layer in a first direction,
wherein a ratio of an area of the first filler to an area of the conductive polymer layer is 0.55 or more and less than 0.83 in a first cross-section partially overlapping the sintered tantalum body, among cross-sections perpendicular to the first direction.

21. The tantalum capacitor of claim 20, wherein the conductive polymer layer includes poly(3,4-ethylenedioxythiophene):poly(styrenesulfonate) (PEDOT:PSS).

22. The tantalum capacitor of claim 21, wherein the first filler includes one or more metal oxides, among $BaTiO_3$, $Al_2O_3$, $SiO_2$, and $ZrO_2$.

23. A tantalum capacitor comprising:
a tantalum body comprising a sintered tantalum body including tantalum particle, a conductive polymer layer disposed on the sintered tantalum body and including a first filler, and a tantalum wire penetrating through at least a portion of each of the sintered tantalum body and the conductive polymer layer in a first direction,
wherein a ratio of an area of the first filler to an area of the conductive polymer layer is greater than 0.38 in a first cross-section, perpendicular to the first direction and cutting a length of the sintered tantalum body in the first direction by 2:1.

* * * * *